United States Patent [19]

Barbare et al.

[11] Patent Number: 4,706,280

[45] Date of Patent: Nov. 10, 1987

[54] ELECTRONIC STEP-BY-STEP TELEPHONE SWITCHING SYSTEM

[75] Inventors: Walter L. Barbare, Dallas; Harley M. Willey, Garland; Ronald D. Higgins, The Colony, all of Tex.

[73] Assignee: Electrotel, Inc., Richardson, Tex.

[21] Appl. No.: 793,632

[22] Filed: Oct. 31, 1985

[51] Int. Cl.⁴ .............................................. H04Q 3/24
[52] U.S. Cl. .................................. 379/284; 379/299; 379/295
[58] Field of Search ............... 379/245, 246, 284, 293, 379/294, 298, 299, 300, 301, 302

[56] References Cited

U.S. PATENT DOCUMENTS

| | | | |
|---|---|---|---|
| 3,546,393 | 12/1970 | Joel | 179/18 |
| 3,626,107 | 12/1971 | Armstrong et al. | 179/18 BC |
| 3,997,731 | 12/1976 | Wilmot et al. | 179/18 B |
| 4,232,199 | 11/1980 | Boatwright et al. | 179/18 B |
| 4,320,259 | 3/1982 | Atkinson | 179/18 FG |
| 4,412,101 | 10/1983 | Brown et al. | 379/299 X |

*Primary Examiner*—James L. Dwyer
*Attorney, Agent, or Firm*—Richards, Harris, Medlock & Andrews

[57] ABSTRACT

An electronic step-by-step switching system utilizes much of the equipment now present in conventional electromechanical step-by-step telephone exchange switches. Conventional line finders, selectors and connectors are modified by removing the relay logic and replacing it with microprocessor based controllers. The modified line finders communicate through a bus with an originating controller and the modified connectors communicate through a bus to a terminating controller. The controllers are interconnected for data exchange through high speed buses that are supervised by a bus controller. A programmer station is installed for bi-directional communication through the bus controller. The originating and terminating controllers include memory storage for maintaining status information concerning the subscriber lines within the groups of corresponding line finders and connectors. The modified line finder works in conjunction with the originating controller to identify the line for an off-hook subscriber. The line number is translated to a telephone number by the originating controller making possible the addition of functions and revenue features for a local telephone exchange. Likewise, the addition of identifying information about called parties by the storage of information in the terminating controller makes possible the addition of still further features which can be implemented in a substantially conventional electromechanical step-by-step telephone exchange.

7 Claims, 5 Drawing Figures

ELECTRONIC STEP-BY-STEP TELEPHONE SWITCHING SYSTEM

FIELD OF THE INVENTION

The present invention pertains in general to telephone switching systems and in particular to a step-by-step telephone switch.

BACKGROUND OF THE INVENTION

Direct control switching systems, also known as step-by-step systems were developed many years ago to replace the previous manual telephone switches. In recent times there has been a conversion to common control switching systems which make use of digital techniques. The common control systems have been installed in many of the large exchanges and in new exchanges. However, there are still many local telephone exchanges which still operate with direct control switching systems. Many of these exchanges have such a large investment in capital equipment that it is not economical to purchase current technology digital switches. But as a result of the divestiture of the Bell System and the need for additional telephone service features, there exist a need for substantial technical improvements for the existing telephone exchanges having step-by-step equipment.

In the more modern, common control switching system, dialing is completed before the switching takes place. When the dialing has been completed through the common control equipment, the digits are decoded and then a connection is set up through a switching matrix to connect the parties. The common control equipment is then available for handling another call. Since the common control equipment is used only for a few seconds for each call, it is possible for a very large number of calls to be set up through the switching equipment.

The common control switching architecture has evolved into modern electronic analog and digital switching systems. The older direct control switching technology has been limited to individual circuit improvements and external circuit add-ons for improving and adding particular functions.

In the direct control switching system, the call progresses through the office as each digit is dialed until the desired number is reached. One unit of equipment translates each digit and connects the call to the next stage of selection for the next digit. The equipment which is used for the selection remains held in the transmission path for the duration of the call. Upon completion of the call, all of the equipment used for the call is released.

The existing step-by-step switching systems, direct control architecture, which is in use throughout the telephone industry, provides basic telephone service by the use of electromechanically controlled switching devices known as line finders, selectors and connectors. Auxiliary trunk circuits are connected to provide special services such as coin box, long distance, directory service, custom calling features, etc.

Each of the three types of step-by-step switches consists of three basic parts, an electromechanical relay assembly, the stepping mechanism, and a disconnect mechanism.

The electromechanical relay assembly provides the intelligence and control for a particular type switch. This assembly provides the following features:

1. Recognizes seizure and disconnect (supervisory function).
2. Drives the vertical and rotary stepping magnets in response to the digit dialed.
3. Tests for busy or idle trunks, lines or telephone numbers in the bank multiples.
4. Connects signaling and status tones such as dial tones, busy, overflow and audible ring to the called line.
5. Connects ringing current to the called line.
6. Provides talking battery and ground to the talking path.
7. Detects hang-up and activates the switch release mechanism.

The stepping mechanism includes magnets, ratchets, springs and other devices. This mechanism operates under the direction of the relay assembly for causing the shaft and associated brush or wiper assemblies to connect to the desired bank terminal in response to the digit which was dialed.

The disconnect mechanism is much like the stepping mechanism, but causes the switch to return to its normal idle position when directed by the relay assembly at the time of subscriber disconnect.

The bank multiple terminates subscriber lines (line finder) telephone numbers (connector), or trunks (selectors) to succeeding switching stages in the dial train. There are usually three terminals associated with each bank location. Two of the terminals make up the signaling and talking circuit with the third providing supervisory or control functions. The brushes or wipers of the switch shaft provide the electrical connection from the preceding circuit to the next switching stage of the switch train.

A primary limitation of the conventional step-by-step telephone switch is its lack of capability for identifying a calling party, for call routing and auxiliary service provision. In past years, due to the existence of a unitary telephone company, such capability was not provided in the smaller step-by-step offices. While add-on equipment for provision of number identification for billing purposes (ANI) is available, internal line indentification within the line group on every call has not been available. However, in light of the new regulatory environment with the breakup of the Bell System, and customer demand for custom calling features in all offices, the need for line identification exists.

In summary, due to the continued wide-spread use of step-by-step telephone switches in many telephone exchanges, the changing business nature of the telephone system and the requirement that local exchanges be more cognizant and exercise more control of local operations, there exists a need for apparatus for updating the capabilities of step-by-step telephone switches without total replacement of exchange equipment.

THE SUMMARY OF THE INVENTION

A selected embodiment of the present invention comprises a telephone switch which includes a plurality of line finders connected to a plurality of telephone lines for detecting an incoming call through the lines. A plurality of originating controllers are connected to communicate with the line finders, the controllers including memory for storing at least one status condition for each of the lines. Each of the line finders is connected to an individual selector for entrance into the dial switching train. The line finders receive incoming digits from subscriber lines, buffer the digits and outpulse to the selectors as directed by the translation tables of the originating controllers. Several stages of selectors may be provided depending on the size of the switch. A plurality of connectors is provided which have the subscriber lines provided thereto and is connectable to the last selection stage of said pathway through said selectors, said connectors providing the last connection in the data path between the calling party and a called party for completing a telephone call. A plurality of terminating controllers are connected to communicate with a plurality of connectors. The terminating controllers include a memory for storing at least one status condition for each of the lines. A bus interconnects the originating controllers and the terminating controllers for transferring status condition information concerning said lines therebetween. A programmer is connected to the bus for providing office data for storage in the memories of the controllers and for receiving line activity information from the controllers.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION OF THE INVENTION

Step-by-step electromechanical switches are in use in a large number of smaller telephone exchanges. Under the changing telephone network structure, these exchanges must soon phase-in additional functions and responsibilities to meet the marketing and revenue requirements in their exchange areas. Many Public Utility Commissions (PUC) are requiring specialized services, such as metered service, to be provided along with the conventional telephone service. The larger exchanges and new exchanges have been able to purchase large digital switching systems which easily incorporate the new features and requirements. However, the smaller exchanges have a large capital investment in the older step-by-step equipment and, in many cases, the complete replacement of this equipment is not economically feasible.

The primary units now in use in step-by-step switches are line finders, selectors, and connectors. Basically, the line finder detects an off-hook condition, the selectors respond to the dialed digits to establish a pathway through a matrix and the connector provides a connection between the established pathway and the called party. Each of the line finders and connectors works with a group of telephone lines, typically 100 lines to the group. Thus, even a moderate sized telephone exchange switch has a large number of line finders, selectors and connectors.

The line finders, selectors and connectors used in step-by-step switches are electromechanical devices which have been subject to considerable refinement over the years. However, these devices still require extensive maintenance and repair. Further, such electromechanical switches do not provide all the many, and revenue producing, features now available for large modern switching systems.

The primary objective of the present invention is to utilize the basic switching portion of the existing electromechanical devices, which comprise a substantial capital investment and have proven to be reliable and relatively efficient. The switching logic for each of these units is replaced with an electronic module for providing the intelligence to perform the switching function. The replacement of individual units over a period of time can serve to update the entire system without a major cutover of equipment. The present invention further provides a plurality of originating controllers for directing the operation of the line finders and storing information related to the status of each line, such as identifying the line number and the optional features implemented for that line. Connectors are controlled by a plurality of terminating controllers which also maintain a status of features for each of the called lines. An originating bus and a terminating bus interconnect the originating and terminating controllers for exchanging information concerning the establishment of calls through the switch. A bus controller monitors the information exchange through the buses and provides an interface to a programmer which provides a management and data storage function for the entire step-by-step switch.

Figure 1:
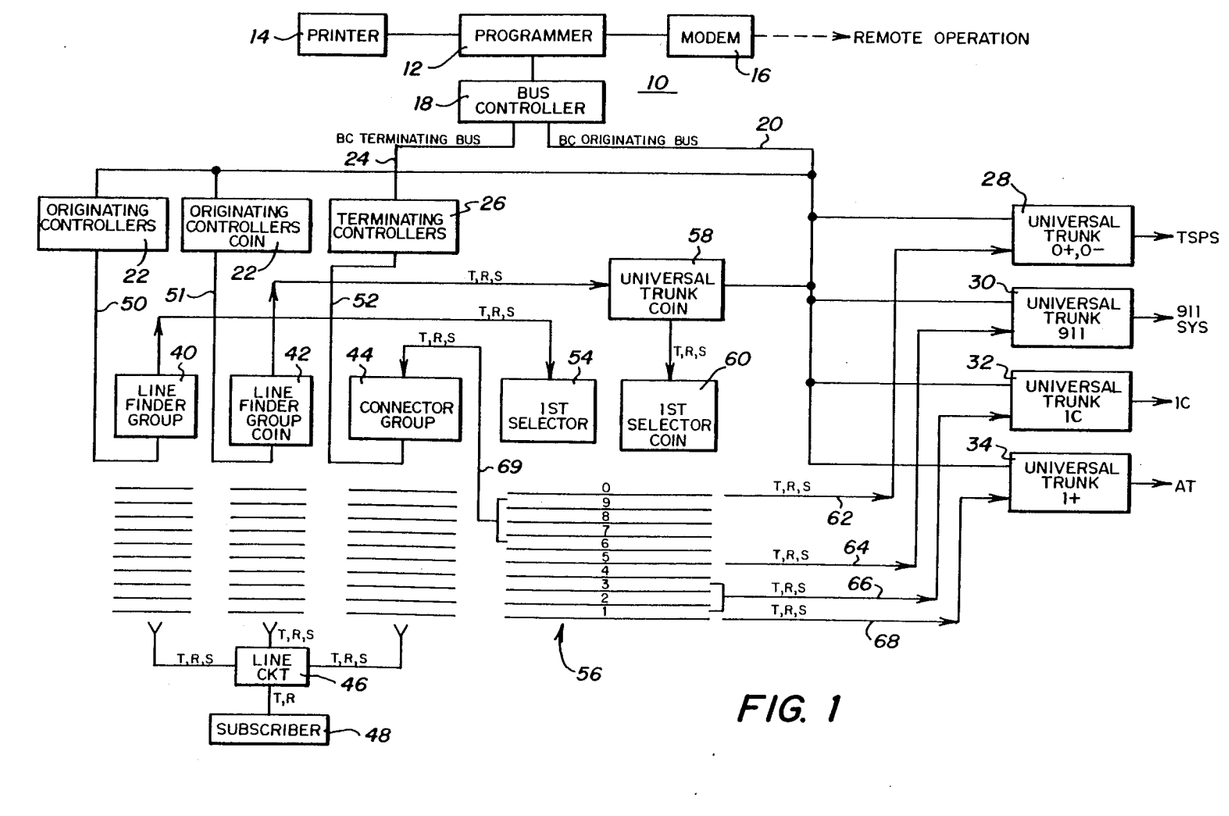
FIG. 1 is a block diagram of the electronic step-by-step telephone switching system of the present invention.

Referring now to FIG. 1, there is illustrated an electronic step-by-step switch 10 in accordance with the present invention. Communication with switch 10 is carried out by a programmer 12 through which office data is provided to the various controllers. System status reports are output via programmer 12. Programmer 12 in a selected embodiment is an IBM PC XT computer. The programmer 12 is connected to a printer 14 and to a modem 16 which provides for remote operation of the programmer 12.

The programmer 12 is further connected to a bus controller 18. The controller 18 is connected through an originating bus 20 to a plurality of originating controllers 22. The controller 18 is further connected through a terminating bus 24 to a plurality of terminating controllers 26. The originating bus 20 is further connected to trunks 28, 30, 32 34, and 58.

Universal trunk 28 is connected to provide operator assistance. The term TSPS stands for Traffic Service Position System. Trunk 30 provides emergency 911 service. The universal trunk 32 is provided to include service for direct trunking to inter-LATA carriers. And finally, universal trunk 34 is connected for long distance service in response to 1+dialing (Access Dialing AT).

Each controller 22 is connected through a control line 50 to a line finder group such as 40 which comprises a plurality of line finders and subscriber line terminations indicated by the stacked horizontal lines. Likewise, another controller such as 22 is connected through a control line 51 to a second line finder group 42. A line finder group terminates up to 200 lines for originating service.

Likewise, another controller such as 22 is connected through a control line 51 to another line finder group 42 for the provision of coin service. This group is unique because of the universal trunk 8, adapted for coin service, connected between each line finder of line ground 42 and its serving first selector 60.

The plurality of terminating controllers 26 are connected to communicate through control buses 52 to a plurality of connector groups 44.

The groups 40, 42 and 44 each comprise a set of individual devices. These devices are connected to a plurality of subscriber lines through a plurality of line circuit 46. Each of the lines passing through the circuit 46 is connected to a subscriber, such as 48. Each subscriber is connected to his line circuit by two conductors labeled T and R otherwise known as a cable pair.

The line finders in the group 40 are connected to a first selector 54 which operates in a selector matrix 56.

The line finders in group 42 are connected to a universal trunk 58 which is in turn connected to a first selector 60. Trunk 58 provides the function of coin collection and return for pay stations. The selector 60 is also included within the matrix 56. The matrix 56 includes a plurality of selectors which are sequentially connected in response to the dialed digits received from an incoming call. The sequence of selectors forms a pathway through the matrix which is eventually tied to a connector within the group 44 for ultimate connection to the called party.

The universal trunk 58 is further connected to the originating bus 20 for receiving operating commands and exchanging status information with the controllers 22 and 26 and the programmer 12.

The matrix 56 is further connectable to a voice line, indicated as T, R and S, 62 to the universal trunk 28. A voice line 64 is connected from the matrix 56 to the universal trunk 30. The voice line 66 is connected from the matrix 56 to the universal trunk 32. And likewise, a voice line 68 is connected from the matrix 56 to the universal trunk 34.

Operation of the electronic step-by-step telephone switching system in accordance with the present invention is now described in reference to FIG. 1. When a subscriber 48 removes his telephone from the hook, goes to an off-hook condition, one of the line finders within group 40, or 42 is directed to locate the particular subscriber line. This is done in a conventional fashion. When this is done, the particular line finder, with the added circuitry of the present invention, reports to the originating controller 22 the identification of the subscriber, that is, the number of the calling party. At this point a check is made against a status file, stored within the controller 22, to determine various information about the calling subscriber. This information can include the validity as a subscriber, the registration as a multitone subscriber, and other features such as preferential long distance carrier. If the subscriber does meet the requirements for completing a call, the line finder within group 40 furnishes dial tone and connects to a first selector. The selector 54 then receives the first digit from the line finder and makes a connection within the selector. Additional selectors are connected within the sequence of receiving additional digits dialed by the subscriber and received from a line finder. Eventually the last selector is connected to a connector within a group 44 via the selector level trunks of the last selector stage 69 and the remaining two digits provide the final selection to the called party. The connector within group 44 determines whether the called party is busy or idle. If the party is busy, then a busy tone is directed back through the pathway through the selectors to the subscriber. If the called party's line is idle, then a ring is provided on the called line. Should the called party then go off-hook, the ring is terminated and a call connection is established between the subscriber and the called party.

Upon determination of the called party at the connector within group 44, the terminating controller receives information identifying the called party. At this point a status table is consulted, which is stored in a memory in the controller 26, to determine information about the called party. One item of this information could be whether the party is off-hook. Further information concerns features such as validity status, multiple numbers, call-waiting, number translation, call forwarding, as well as other features.

The originating controller 22 and terminating controller 26 communicate through the bus lines 24 and 30 by use of the bus controller 18. Status information concerning the various subscriber lines is interchanged between the two controllers through the bus lines. For example, when a subscriber call is initiated, the originating controller 22 provides a status reflection identifying that subscriber as being busy and this status of being busy is stored within the memory in controller 26.

Should the subscriber input a dial sequence that is not directed to a party served by the same switch, the initial digits can be recognized by the originating controller 22 which would then direct the call signal directly to the universal trunk 58. The universal trunk 58 is typically used only with coin telephone calls which are exclusively associated with the line finder group 42. These coin calls can then be directly connected to the universal trunks 28-34.

Should a subscriber, such as 48, input a dial sequence that is not within the same switch area, the selectors within matrix 56 can connect the talk line through any one of the lines 62, 64, 66 and 68 to any one of the universal trunks 28, 30, 32 and 34 or local interoffice trunks terminating on a selector level.

The programmer 12 serves to build the status files for the various controllers, such as 22 and 26, within the switch 10. The files are updated when a new subscriber is added, an old subscriber is deleted or a new function is added or deleted for any particular subscriber. All of this information is input and stored in the programmer 12. At appropriate times this information is transferred directly to the controllers 22 and 26 for storage therein. The programmer 12 is not utilized in the routine process of completing calls through the switch 10.

The electronic step-by-step switch 10 of the present invention replaces the original line finders, connectors and selectors of a conventional electromechanical switch with new units, described below, which provide additional functions. The result is that all the previous functions performed by each step switch are maintained but a large variety of new functions can be implemented due to the use of the controllers 22, 26, the communication provided by the bus controller 18 and the management function provided through the programmer 12.

Figure 2:
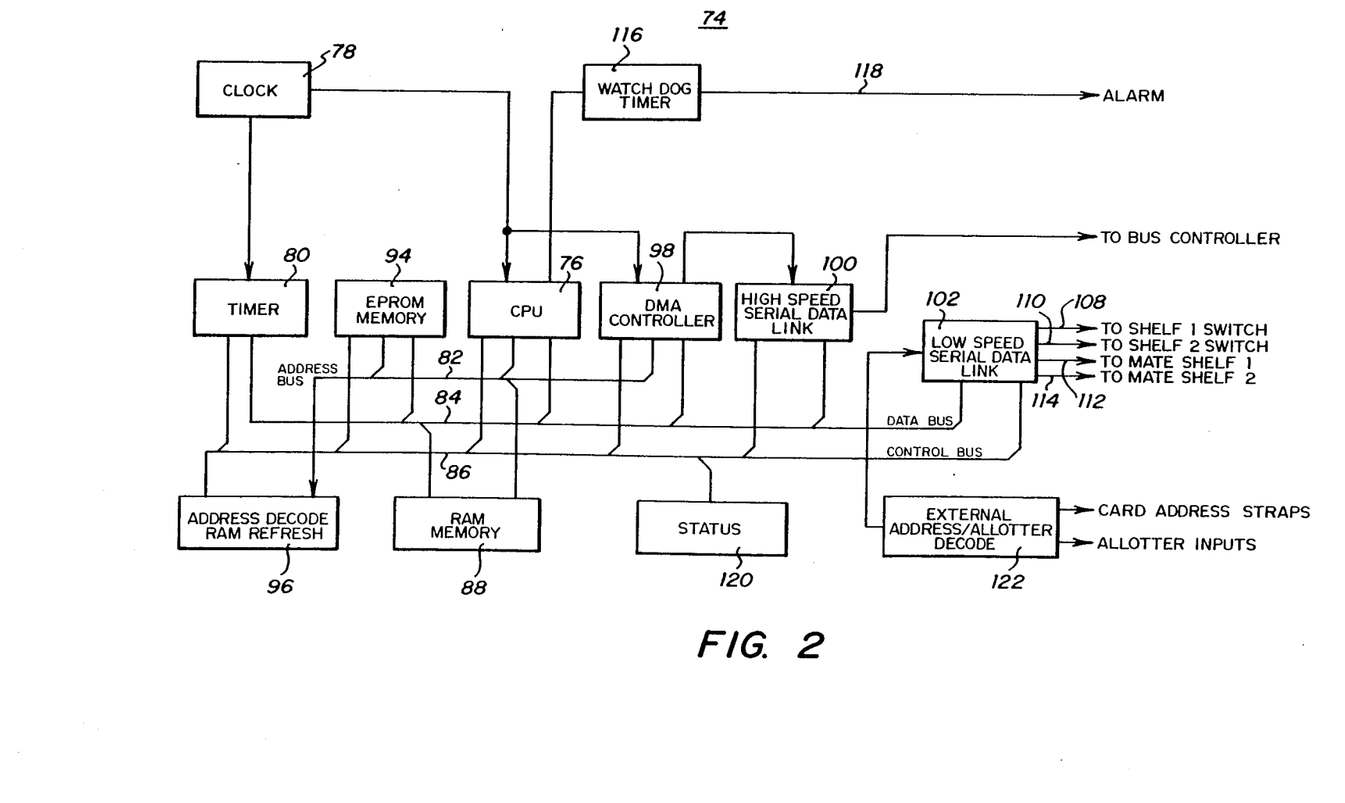
FIG. 2 is a block diagram for both the originating controller and terminating controller of the present invention.

Referring now to FIG. 2 there is illustrated a controller 74 which can be utilized to serve as either the originating controller 32 or the terminating controller 26 as shown in FIG. 1. The controller 74 serves as the distributed intelligence for the switch 10. Each of the controllers 22 and 26 communicates with the other through the high speed buses 20 and 24. Each of the plurality of controllers 22 and 26 controls a line group or connector group of step switches.

Referring further to FIG. 2 a Central Processing Unit (CPU) 76 is a microprocessor which drives the controller 74. A preferred embodiment of the CPU 76 is a Z80 microprocessor. This particular microprocessor has an 8-bit word and operates with a clock speed of 4 mHz. This is regulated by a clock circuit 78 which is connected to drive a timer 80. The CPU 76 is connected to the remainder of the units within the controller 76 through an address bus 82, a data bus 84 and a control bus 86.

The controller 74 further includes a RAM memory 88 which is connected to the buses 82 and 84. Memory 88 is preferably a 128 K words (131,072 words) storage comprising two banks of dynamic RAM memory circuits. The two banks are required since the Z80 microprocessor 76 can directly access only 64 K addresses. Within the memory 88 there is stored the executive program for the CPU 76, customer data base information as well as further information about call activity within the switch 10.

Controller 74 further includes an electronically programmable read only memory (EPROM) 94 which is likewise connected to the buses 82, 84 and 86. There is stored within the memory 94 a "boot" program for initiating operation of the controller 74. This program provides self-checks and initiates communication with the programmer 12 to down load the executive program and database for storage in the memory 88.

An address decode and RAM refresh circuit 96 provides address decoding for the buses 82, 84 and 86 to make possible communication through these buses. The circuit 96 further provides automatic refresh for the memory 88, which is typically a dynamic memory, to prevent burdening the CPU 76 with this function. The timer circuit 80 provides basic timing for the call processing, including delays, such that the CPU 76 may continue other functions without the necessity for providing the timing.

A direct memory access controller 98 unburdens the CPU 76 from the extensive interrupts that would be required for the communication tasks. The DMA controller 98 works with the high speed serial data link 100 to provide direct access to the RAM memory 88. The controller 98 informs the CPU 76 when a transfer has occurred.

The high speed serial data link 100 communicates with the bus controller 18 at a preferred 100 K baud rate. Circuitry is provided within the link 100 to retrieve the clock. The data protocol is Synchronous Data Link Control (SDLC). The circuitry is a biphase M encoder which provides data transitions to restore the clock.

The low speed serial data link 102 provides four low speed (3496 baud) serial ports 108, 110, 112 and 114. The controllers, 22 and 26, are connected in a mate fashion so that two of the ports are for its own line group and two are for the mate's lines group. The mate ports remain tri-stated off for normal operation. Upon failure or removal of a master controller, 22 or 26, a contact closure is removed from the mate and it now assumes control of both sets of switches. The bus controller 18 keeps both master controllers, 22 and 26, updated with the controller data for each switch.

A watchdog timer circuit 116 monitors the controllers, 22 or 26, off line, generates an alarm through line 118 and activates the mate function of the paired controller if the CPU, such as 76, fails to update the watchdog circuit in a predetermined time (5 ms).

A status circuit 120 comprises a plurality of light emitting diodes which reflect the status of the controller, 22 or 26, to show both normal and fault operation.

An external address/allotter decode circuit 122 provides option switches and allotter inputs which are read into the memory 88 via the link 102.

Figure 3:
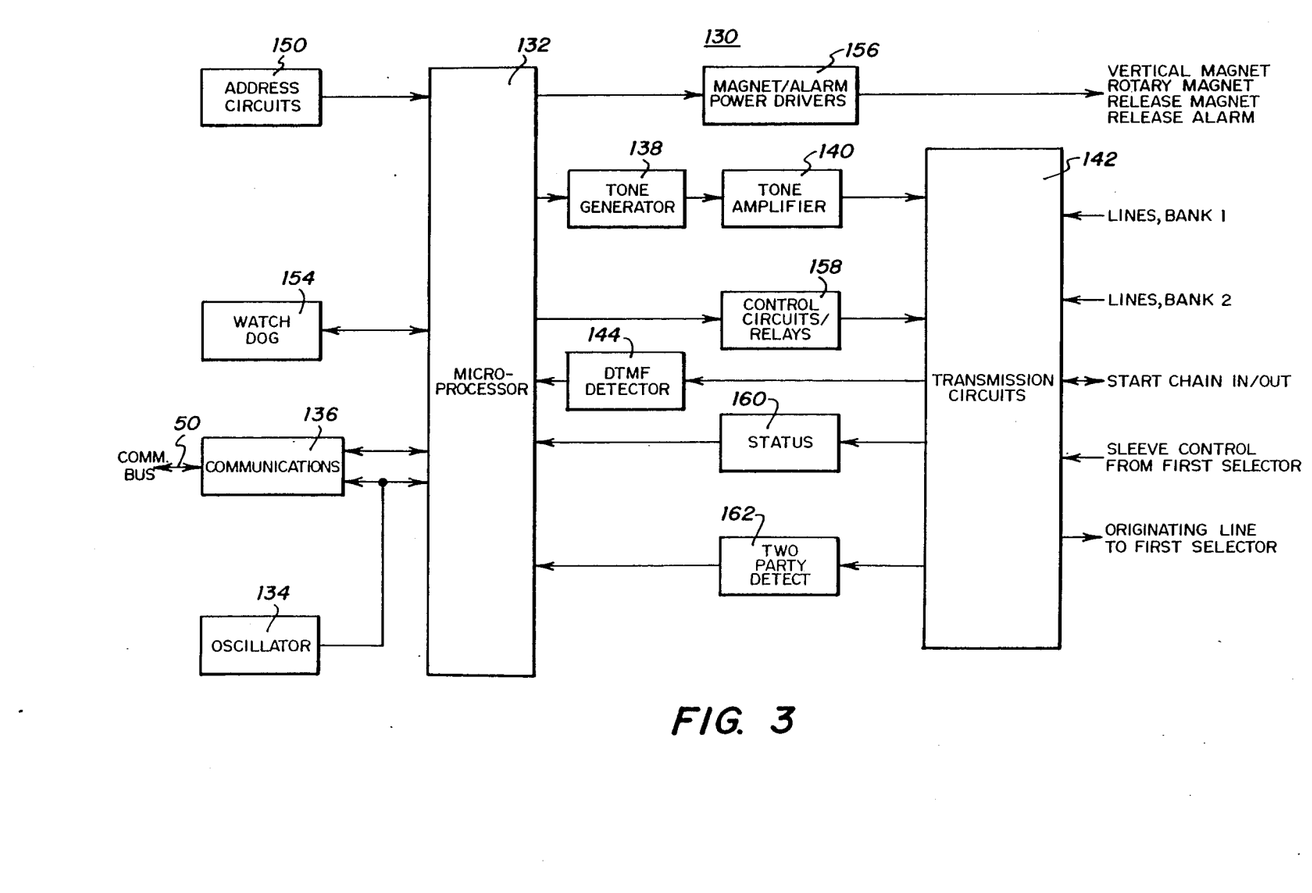
FIG. 3 is a block diagram of a line finder in accordance with the present invention.

Line finder circuitry 130 in accordance with the present invention is illustrated in FIG. 3. The line finder circuitry 130 is used in each of the line finders within either of the groups 40 or 42, shown in FIG. 1. The purpose of the line finder using circuitry 130 is to detect an off-hook status for a subscriber line and to report the identification to the subscriber to the originating controller 22.

The line finder circuitry 130 shown in FIG. 3 includes two sections, which are logic and interface. The line finder circuitry 130 comprises a printed circuit board having functions shown in FIG. 3 and a standard line finder unit which has had the relay logic removed and replaced with the line finder circuitry 130 shown in FIG. 3. Thus, the overall line finder used in the present invention includes the original vertical magnet, rotary magnet, release magnet and off-normal switch. The original frame of the conventional line finder is maintained for the same mounting within the existing rack. The interface with the existing shelf the same but with the addition of a two wire communications bus which is connected to unused switch jack pins. This communication bus 50 is connected to the originating controller 22.

Referring now to FIG. 3, the logic portion of the line finder 130 includes a single chip microprocessor 132 which is preferably a model PIC 1670 manufactured by General Instruments. This microprocessor contains within a single chip a CPU, RAM and ROM. The program is stored within the ROM such that no reload is required on loss of power. The address and data bus are contained within the chip so that the microprocessor 132 receives and sends information via input and output ports.

An oscillator 134 operates a nominal frequency of 3.58 mHz. The oscillator 134 is connected directly to the microprocessor 132 as well as to a communications circuit 136.

The tone generator 138 is driven by the microprocessor 132 and serves to provide dial, reorder and confirmation tones. The output tone generator 138 is passed through a tone amplifier 140 to transmission circuits 142.

A DTMF (dual tone multiple frequency) detector 144 converts DTMF signals to dial pulses. The DTMF signals are received through the transmission circuits 142 and the dialed digits are provided to the microprocessor 132 which converts the DTMF digits to dial pulse (DP). This conversion is necessary since the step-by-step switch 10 functions on a pulse basis rather than by the use of tones.

Address circuits 150 include a plurality of switches which serve to set a unique physical address for each switch within the line finder groups 40 and 42.

Communication to the microprocessor 172 is provided via the communications circuit 136 which is in turn connected through the communication bus 50 to the originating controller 22. The communication bus 50 operates at 3496 baud. This bus is compatible with the communication standard Electronic Industries Association (EIA) RS-485 and is further tri-stated.

A watchdog circuit 154 provides an alarm and stops the microprocessor 132 if it is not serviced within a time out. The watchdog circuit 154 is connected via an output and the reset input to the microprocessor 132.

The second portion of the line finder circuitry 130 provides an interface function for converting low power signals from the microprocessor 132 to useful levels that can drive the stepper magnets of the overall line finder. This portion also provides a transmission path for the call.

A magnet/alarm power driver circuit 156 includes Darlington transistors with flyback diodes and transorbs which serve to drive the vertical magnet, rotary magnet, release magnet and release alarm for the line finder unit. The drivers within the circuit 156 operate between minus 48 volts and ground and are designed to handle inductive loads.

Control circuit/relays 158 are driven by the microprocessor 132 and provides an output to the transmission circuits 142. The control circuit/relay 158 serves to switch between lower and upper banks of lines, pulse the switch train, connect tone signals, etc.

Each of the line finders services 200 lines, 100 in each bank. This is for the purpose of connecting to the accessing party.

The control circuit/relays 158 detect incoming dial pulse (DP) digits, buffer the digits, transmit the digits to the microprocessor 132 for the translation, then outpulse as directed by the microprocessor 132. The control circuit/relays 158 also outpulse (DP) incoming DTMF digits received by DTMF detector 144 and translated by the microprocessor 132.

A sleeve status is detected by status circuit 160. The sleeve status determines the calling party for the detected off-hook subscriber line.

A two party detect circuit 162 determines if a resistance is on the tip or ring side of the subscriber's line detected by the line finder. This information is passed to the microprocessor 132 which communicates it to the originating controller 22 for appropriate billing.

The transmission circuits 142 comprise a group of contacts and relays providing connection to the subscriber lines in banks 1 and 2, a bidirectional start chain in and out, a sleeve control from the first selector, such as 54, and an originating line to the first selector 54.

Briefly, the line finder circuitry 130 operates in conjunction with the remaining vertical, rotary and release magnets of a conventional line finder unit and replaces the relay logic. The line finder circuitry 130 provides numerous additional features over that found in a conventional line finder unit. Included in these features are identification of the calling line and transfer of this information via the communications bus 50 to the originating controller 22.

Figure 4:
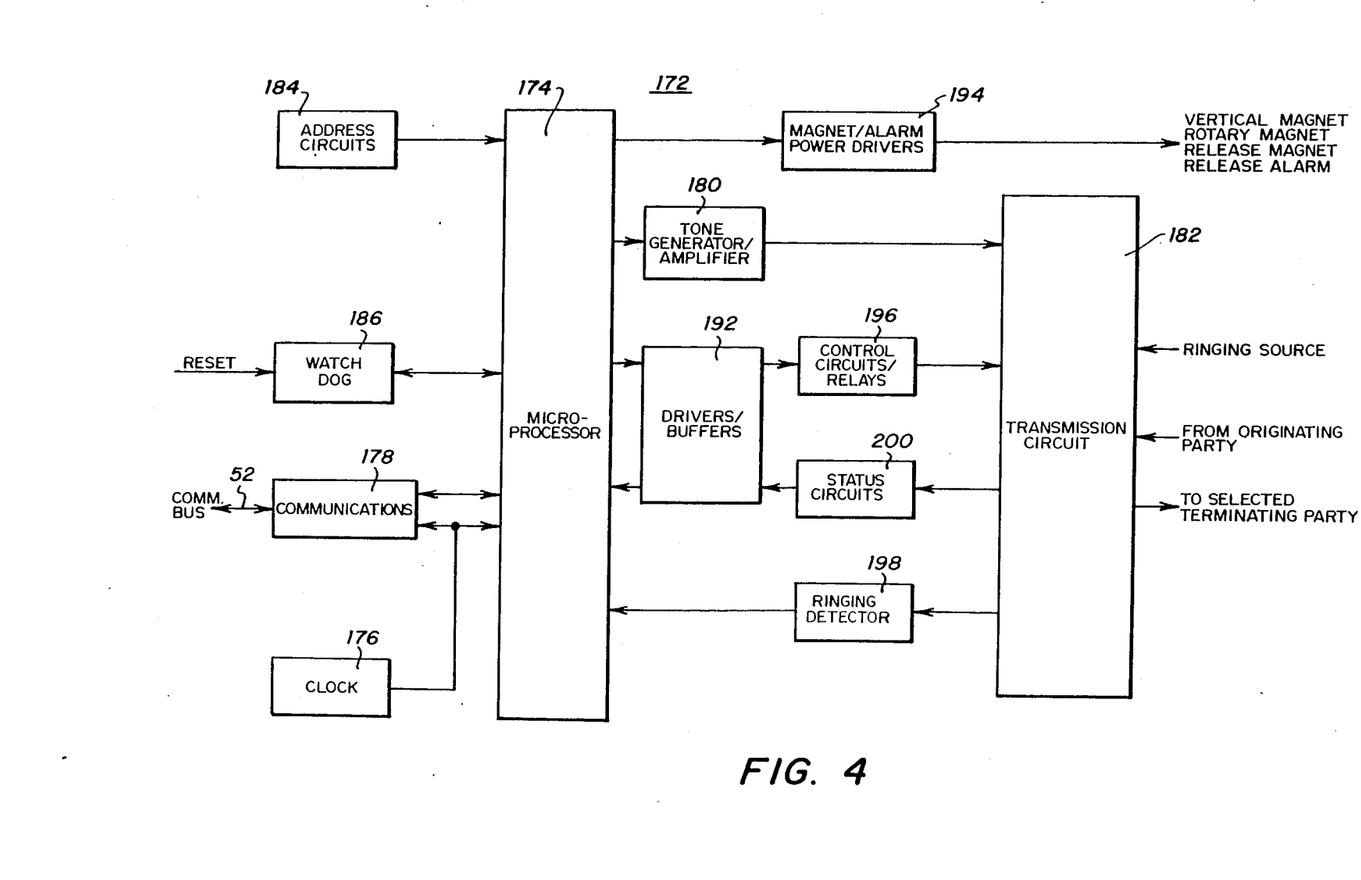
FIG. 4 is a block diagram of a interface circuit for use in the present invention.

Connector circuitry 172 is illustrated in FIG. 4. Circuitry 172 is used in conjunction with portions of a conventional connector to form a new connector for use in accordance with the present invention. The circuitry 172 replaces the relay logic used with a conventional connector. The purpose of a conventional connector is to use the last two digits of the dialed number to find a called number within a 100 group. The connector test for busy at the proper line and if such a test is positive, a busy tone is returned through the incoming signal path. If not, the connector circuitry 172 applies a ringing signal to the called line. The circuitry 172 then monitors the line and removes the ringing voltage and cuts through the call when the phone is answered. The circuitry 172 provides additional features over a conventional connector. These additional features can include call waiting, call forwarding and three-party calling.

The overall connector for use with the present invention includes the connector circuitry 172 and portions of a conventional connector unit. The conventional connector has all switches and relays removed except for the vertical magnet, rotary magnet, release magnet and vertical-off-normal (VON) switch. The overall connector is mounted on an existing shelf with the interface remaining the same with the addition of a two wire communications bus through unused switch jack pins.

The circuitry 172 includes a single chip microprocessor 174 which is preferably a model PIC 1670 manufactured by General Instruments. This microprocessor includes a CPU, RAM, and ROM.

A clock circuit 176 is connected to supply a clock signal to the microprocessor 174 as well as to a communications circuit 178. The clock circuit 176 operates at a nominal frequency of 3.5 mHz which is divided within the microprocessor 174 to a frequency of 900 kHz. The clock also provides a clock signal for a tone generator/amplifier circuit 180. The generator/amplifier 180 is connected to an output of microprocessor 174 and provides a tone signal to transmission circuit 182.

The tone generator/amplifier circuit 180 provides busy, audible ring and confirmation tones.

Address circuits 184 include a plurality of switches which are set to determine a unique address for each of the connector switches, used in accordance with the present invention, within each group of connector 100.

The communications circuit 178 is RS-485 compatible and serves to drive the communication bus 52 which is connected to its serving terminating controller 26. The circuitry within the communications circuit 178 provides a tristate output condition to prevent interference with other units. Upon receipt of a correct address from the terminating controller 26, the communications circuit 178 converts to a transmit mode and responds to the terminating controller within an allotted polling period. The data protocol is address, command, response (if required) and sync for each polling.

A watchdog circuit 186 provides an alarm and stops the microprocessor 174 if it is not serviced within a predetermined time period.

A drivers/buffers circuit 192 is connected to both receive and transmit information to the microprocessor 174. The circuit 192 provides level translation such that the microprocessor 174 transmits and receives the correct voltage levels.

Magnet/alarm power drivers 194 provide the same function as the magnet/alarm power drivers 156 described previously in reference to FIG. 3.

A control circuit/relays circuit 196 are more complex for the connector circuitry than for the corresponding circuit 158 for the line finder circuitry 130 shown in FIG. 3. The connector circuitry 172 must provide a reversal of polarity for the call upon answer of the called line to trigger billing equipment. The control circuit/relays 196 further detects hook switch flashes and disconnects at a terminating party. A relay within the circuit 196 also provides ringing for the called line, ring back to the calling party and line terminating during hold while call waiting is answered.

A ringing detector 198 is connected to an output from the transmission circuit 182 and provides an input to the microprocessor 174. The detector 198 senses the DC current in a terminating line. When a phone is removed off-hook, the resulting lower impedance of the phone increases the current and trips the detector 198. Within the detector 198 there is provided a strap for selecting negative or positive battery. The detector 198 only senses superimposed ringing configurations.

The transmission circuit 182 primarily comprises relay contacts and coils. The circuit 182 provides interconnect paths between the inputs and outputs thereof including a ringing source, a line from an originating party and a line to a selected terminating party.

Status circuits 200 include an array of LED emitters for indicating status conditions. The circuits 200 are connected to the transmission circuit and provide an input to the driver/buffer circuit 192 which is in turn connected to the microprocessor 174.

Figure 5:
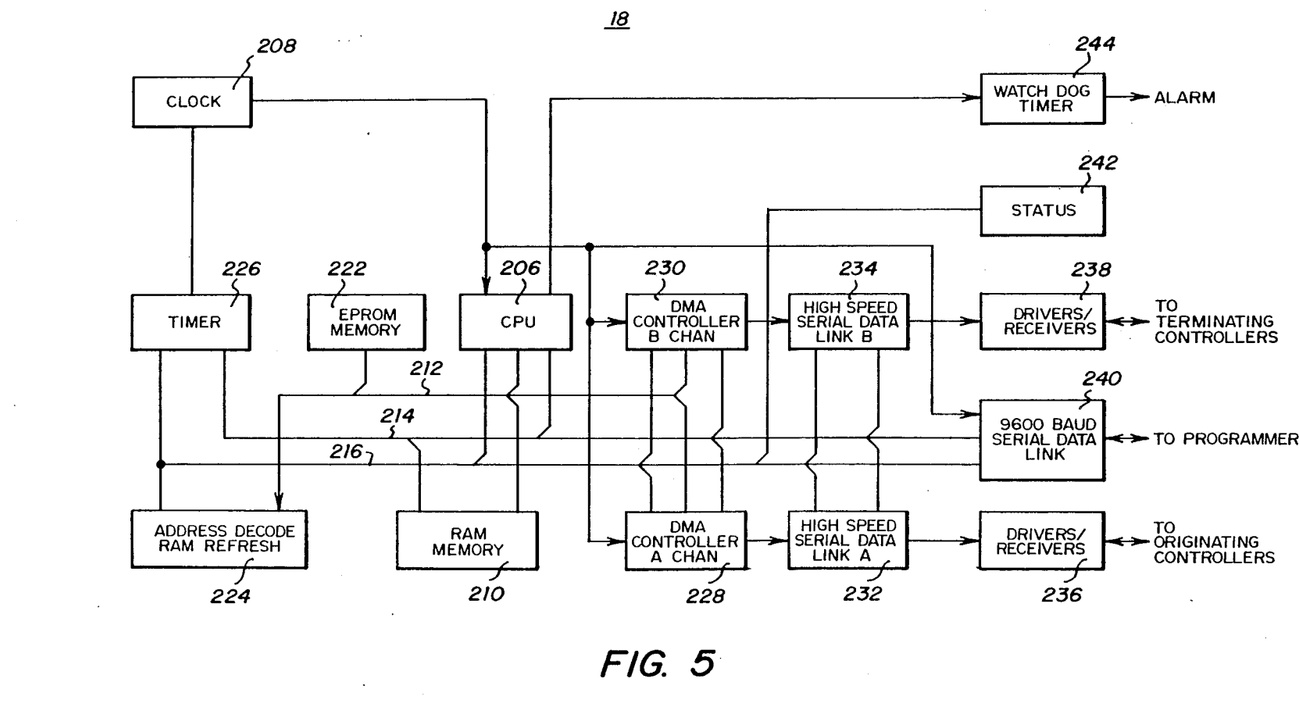
FIG. 5 is a block diagram of the bus controller of the present invention as shown in FIG. 1.

The bus controller 18, shown in FIG. 1, is illustrated in a detailed block diagram in FIG. 5. Bus controller 18 serves as the data distributor for the switch 10. It communicates with the pluralities of controllers 22 and 26 via a plurality of high speed buses which comprises buses 20 and 24.

Bus controller 18 includes a central processing unit (CPU) 206 which preferably is a model Z80 microprocessor. This is an 8 bit microprocessor which operates at a clock speed of 4 mHz. The clock speed is set by a clock circuit 208 which is connected to the CPU 206. RAM memory 210 provides storage of the executive program and data package for the bus controller 18. The memory 210 is preferably of the dynamic type with a capacity of 128K words (131,072 words). The memory 210 is divided into two banks since the Z80 CPU 206 can only directly address only 64K of memory.

The bus controller 18 includes an address bus 212, a data bus 214 and a control bus 216. The CPU 206 is connected to all three buses while the RAM memory 210 is connected to only the address and data buses.

The bus controller 18 further includes an electronically programmable read only memory 222 which is connected to the address bus 212 and the data bus 214. The memory 222 includes a "boot" program for initiating communications with the programmer 12 and providing self checks for the bus controller 18.

An address decode and RAM refresh circuit 224 is connected to the address bus 212 and the control bus 216. The circuit 224 provides decoding of addresses to each peripheral unit of the bus and also provides refresh signals for the RAM memory 210. The dynamic RAM memory 210 is automatically refreshed such that the CPU 206 software is not involved in that function.

A timer circuit 226 provides timing functions for the call processing. The timer 226 is connected to the data bus 214 and the control bus 216. It is further connected to the clock circuit 208.

The bus controller 18 further includes an A channel DMA controller 228 and a B channel DMA controller 230. These controllers provide direct memory access to the RAM memory 210 to relieve the burden on the CPU 206. Controller 228 works with a link A high speed serial data circuit 232 and the controller 230 works through a link B high speed serial data circuit 234. The controllers 228 and 230 work to directly put data in the memory 210 and read data from the memory 210 while working through the circuits 232 and 234. This is done without intervention by the CPU 206. One of the controllers 228 or 230 is used with the originating controller 22 and the other of the controllers is used for communication with the terminating controller 26. The high speed serial data circuit 232 is connected through a driver/receiver circuit 236 to the originating controller, such as 22. The high speed serial data circuit 234 is connected through drivers/receivers 238 to terminating controllers, such as 26. The data protocol is Syncronous Data Link Control (SDLC). The circuitry is bi-phase M encoder which insures data transitions so that the clock can be restored. Eight drivers/receivers 236 are provided with an associated multiplex circuit for the originating controllers in the A channel. The B channel is similarly provided with 12 drivers/receivers 238 for the terminating controllers.

High speed communication between the bus controller 18 and the programmer 12 is provided through a serial data link 240. Link 240 is connected to the clock circuit 208, as well as to the data bus 214 and the control bus 216. Link 240 operates at a rate of 9600 baud and functions to retrieve the clock signal within the data.

The link 240 communicates with the programmer 12 through a twisted pair line which operates under the RS-232 protocol.

A status circuit 242 is connected to the control bus 216 and includes a plurality of LED displays for indicating status of items connected to the bus controller 18.

A watchdog timer 244 is connected to the CPU 206 and alarms if the CPU 206 fails to update the watchdog timer 244 within a predetermined time period.

The connectors used in group 44 and the selectors, such as 54, are described in detail in copending application Ser. No. 634,696 filed 7/26/84 and entitled "Electronic Micro-Controlled Conversion Module for Step by Step Switching Apparatus".

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

We claim:

1. An electronic step-by-step telephone switch, comprising:
    a plurality of line finders connected to a plurality of subscriber lines for detecting an incoming call through said lines,
    an originating controller connected to communicate with said line finders and including memory means for storing at least one status condition for each of said lines,
    a plurality of selectors responsive to digits received from said line finders for establishing a pathway through said selectors,
    a plurality of connectors having said lines provided thereto and connected to said pathway through said selectors for selectively connecting said incoming call to a called party for completing a telephone call,
    a plurality of terminating controllers conneected to communicate with said plurality of connectors, said terminating controllers including memory means for storing at least one status condition for each of said lines,
    a plurality of buses for interconnecting said originating controllers and said terminating controllers for transferring status condition information for said lines therebetween, and
    a programmer connected to said plurality of buses for providing office data for storage in said plurality of terminating controller memory means and said originating controller memory means and for receiving line activity information from said origating controller and said plurality of terminating controllers.

2. An electronic step-by-step switch as recited in claim 1 including a bus controller connected to said plurality of buses for supervising information transfer therethrough.

3. An electronic step-by-step switch as recited in claim 2 wherein said programmer is connected to said bus controller, said programmer for receiving said status conditions for transfer through said bus controller and said plurality of buses for storing in said plurality of terminating controller memory means and said originating controller memory means.

4. A method of operation for a step-by-step telephone switch which uses electromechanical line finders, selectors and connectors for placing calls from subscriber lines, comprising the steps of:
- detecting an off-hook condition for a subscriber line by driving a line finder,
- identifying the subscriber line detected by said line finder,
- transferring identity of said subscriber line through a bus to a first controller having a first memory therein,
- checking said first memory by referencing said subscriber identity to find status information about said subscriber,
- transferring information related to said subscriber through a bus to a second controller having a second memory therein,
- connecting said line finder which detected said subscriber line to a first selector,
- generating a dial tone to said subscriber line from said line finder,
- receiving a first pulse digit from said subscriber line at said first selector for driving said selector to a corresponding position,
- receiving additional pulse digits through a series of selectors to establish a pathway,
- joining said pathway to a connector for selecting a called party in response to digits received through said subscriber line,
- transferring information related to said called party through a bus to said second controller to find status information about said called party, and
- completing a call from said subscriber to said called party by operation of said connector.

5. A method as recited in claim 4 including the step of transferring status information related to said subscriber lines from a programmer station through a bus for storage in said first and second memories.

6. A method as recited in claim 4 including the step of connecting a call to a telephone number other than the telephone number dialed within the hundred numbers served by the connector with the translation ability of the terminating controller.

7. A method as recited in claim 4 including the step of providing multi line hunt groups within a connector hundred with nonconsecutive telephone numbers with the translation capability of the terminating controller.

* * * * *